July 10, 1951 A. V. BEDFORD 2,559,843

TELEVISION SYSTEM

Filed Dec. 5, 1946

INVENTOR.
Alda V. Bedford
BY
H. S. Grover.
ATTORNEY

Patented July 10, 1951

2,559,843

UNITED STATES PATENT OFFICE 2,559,843

TELEVISION SYSTEM

Alda V. Bedford, Princeton, N. J., assignor to Radio Corporation of America, a corporation of Delaware Application December 5, 1946, Serial No. 714,322

4 Claims. (Cl. 178—5.2)

My invention relates in general to the art of television transmission and reception and more particularly to the art of transmission and reception of color television.

In the art of color television two differing methods are used for transmission and reproduction of the image being televised, namely, the sequential type of transmission and the simultaneous type of transmission. In the sequential type of transmission the optical image being televised is divided into a plurality of component color images, usually green, blue and red, and, by suitable scanning, signals are developed and transmitted which are representative, first, for instance, of the green component color of a field or frame of the image; next, signals are similarly developed and transmitted which are representative of the red component color, for instance, of the field or frame of the image being scanned; and then, the next signals which are developed by the scanning process to be transmitted are those which are representative of the third component color (i. e., the blue) of the field or frame of the image for example. Since these transmissions of each set of signals follows in a predetermined selected sequence, the system of transmission is referred to as the sequential type of transmission. Such a system is shown, for example, in U. S. Patent 2,413,075 to Otto H. Schade, granted December 24, 1946.

In the simultaneous type of transmission, the image is divided into fields of its component colors, usually by color filters, and these fields are scanned simultaneously to develop signals representative of their optical values, and the signals so developed are transmitted simultaneously. Such a system has been shown for instance by way of example in one of its forms in "Electronic Industries" for December 1946, at page 58 et seq. It is to the simultaneous type multicolor system that this invention relates particularly, although not exclusively, and accordingly it is one of the objects of my invention to provide an improved system of multicolor television transmission which is particularly adaptable to the simultaneous type of color television transmission and reception.

One of the advantages of the simultaneous type of multicolor television transmission is the fact that while a plurality of signals are simultaneously transmitted and, upon reception and reproduction, may be combined to form a color image representative of the color detail of the image being televised, one of the signals transmitted may be received by a so-called black and white receiver, and, upon reproduction, will give a monochromatic representation of the image. This heretofore has been the signal representative of the green component color partly because it is this signal which is transmitted in greatest detail in some systems, as, for instance, in the system set forth in A. C. Schroeder U. S. Patent 2,535,552, granted December 26, 1950, and in at least as good detail as any of the other component colors in normally transmitting systems. Also, it has been found in black and white photography that the use of green-sensitive film provides a black and white print which is reasonably good but generally not as good as obtained from panchromatic film. Hence, the so-called black and white type of television receiver may be used for reception, as well as a color receiver, which inherently permits a greater viewing audience to be served by the single transmission. This may not be done effectively with the sequential type of transmission. It is a further object of my invention, therefore, to provide an improved type of simultaneous multicolor television transmission and which is also adapted for use with black and white or monochromatic types of television receivers and reproducers.

The present system of simultaneous multicolor transmission however suffers from some disadvantages when used with a black and white or monochromatic reproducer. If only the green component color signal is received and reproduced by a black and white receiver, then images that have a high content of the other component colors or red or blue will have the sections in which those colors are prominent reproduced as black. This is not desirable, since, for instance, a view of images such as flowers having a great deal of red will be reproduced as though the red portion of the flower were black, or a dress will appear black instead of red or blue, or the lips of those appearing before the pick-up camera will appear to be black instead of red. The present invention overcomes these disadvantages of systems heretofore known, and accordingly it is a still further object of my invention to provide a simultaneous type of color television transmission, which, when reproduced on a black and white receiver, will give a reproduction which is a panchromatic simulation.

Still further objects and advantages will be evident from the subject matter of the hereinafter appended specification.

In general, my invention contemplates that in my system, as in the presently used systems of simultaneous multicolor transmission, there will be transmitted simultaneously three sets of image signals (disregarding for simplification of description for the moment any synthesizing and sound signal accompaniments) which are representative of the selected component colors of the image. At present, however, there is one set of signals for the green component color, one for the red component color and one for the blue component color and these may or may not be transmitted with equal detail resolution. In accordance with my invention, a plurality of signals are transmitted simultaneously but at least one of these signals contains representations of one of the color components completely and also representations of at least one other, and preferably two, of the other selected component colors. This may be considered as a special signal and it is to the frequency of this special signal that the black and white or monochromatic receiver is tuned or is otherwise received. At the color television receiver however the component color which the special signal represents is derived from the special signal and, when reproduced will, with the other component color signals, reproduce in substantially true color the image being televised at the pick-up point. By way of example, the red component color field of the image being televised may be scanned and signals developed representative of this component color may be transmitted. Similarly, the signals representative of the blue component color of the image may be derived and transmitted. A special signal may be developed then which is representative of all of the green component color values of the image and which contains, in addition, a portion of both the red component color and the blue component color values of the image. This special signal will, upon being reproduced by the black and white receiver, give a much more natural reproduction of the image being televised. At the color receiver the green component signal may be derived from the special signal to make up the third component color.

My invention will best be understood by reference to the drawings in which.

Figures 1, 2, 3:
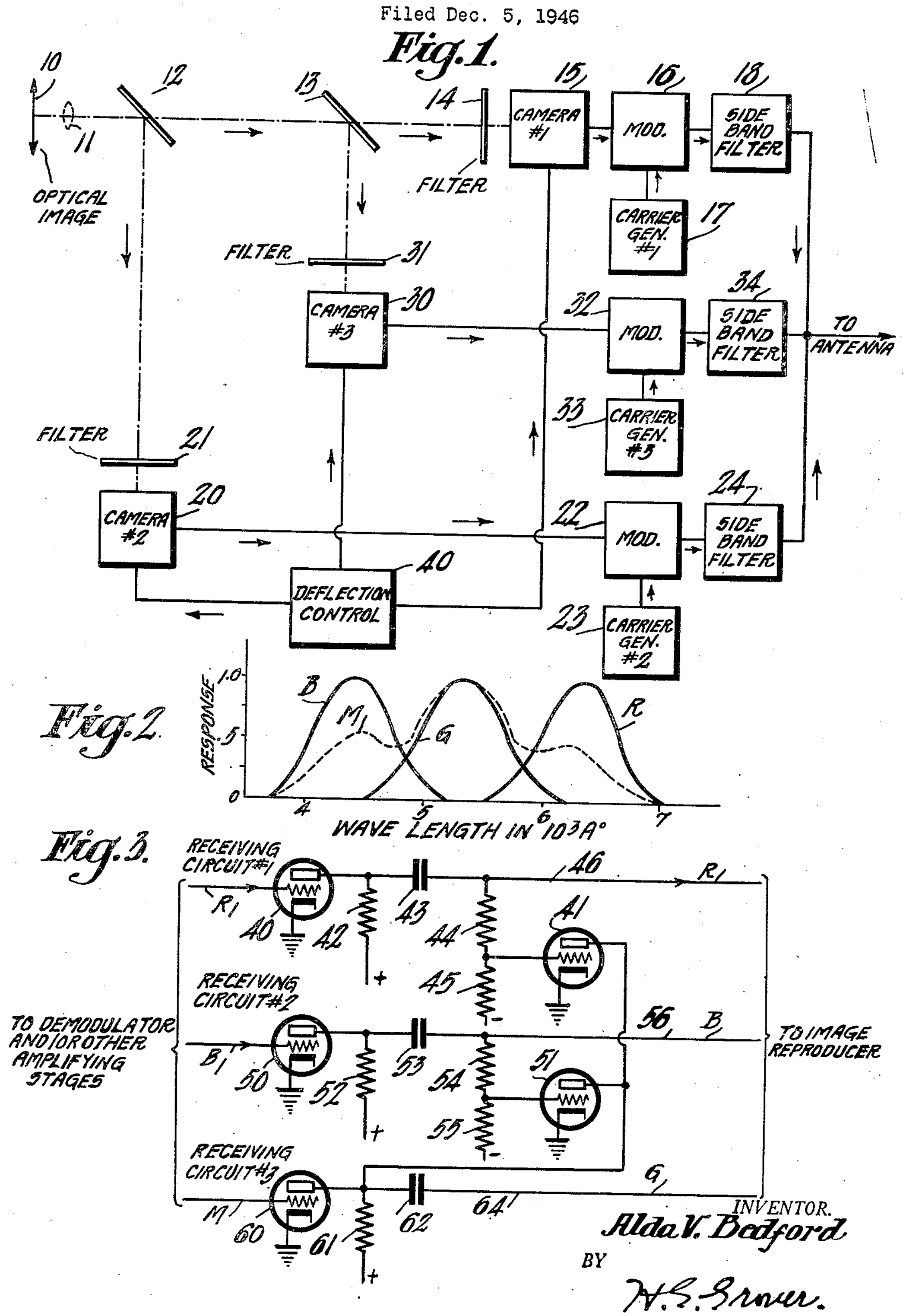
Fig. 1 is a block diagram representation of a transmission system which may be used in practicing my invention.
Fig. 2 is a set of explanatory curves.
Fig. 3 is a schematic representation of one type of circuit for deriving an individual component color signal from the special transmitted signal.

Referring to Fig. 1, there is shown a block diagram representation of a transmitting system which may be used in practicing my invention. It will be understood that this may be done in other ways and this figure is by way of explanation and is not intended to limit the invention to the actual method of or apparatus for practicing it. A scene or an optical image 10 is schematically shown and it is this image which is being televised to derive the component color signals representative of the true coloring of the image. The light rays representing the image 10 pass along an optical axis and are directed by a lens member or optical system 11 where the rays pass therethrough. The emergent light rays are then both reflected and transmitted by a partially transparent reflecting member 12 which may be a third-silvered mirror or a dichroic mirror. The image rays passing through member 12 pass through and also are partially reflected by a second partially transparent reflecting member or dichroic mirror 13. The image rays passing through member 13 are then directed through a color filter 14 onto the scansion or image pick-up tube contained in the first television camera 15.

For purposes of illustration, it will be assumed that the color filter 14 is a red color filter, i. e., it will allow the passage therethrough of only the red components of the optical image and, accordingly, the signals derived by camera 15 will be representative of the red component of the image undergoing scansion.

The signals developed by camera system 15 then are passed to a modulating circuit 16 which has supplied thereto a carrier frequency $f_1$, which is of a selected predetermined frequency developed by a first carrier frequency generator 17. The output of the modulator is then passed through a side band filter whose purpose is to partially suppress one of the side bands formed during the modulation of the carrier frequency from generator 17 by the signal output from the camera 15. The output of side band filter 18 will be in the form of a main carrier with one complete side band and a vestigial side band.

The method of developing the signals, generating the carrier, modulating the carrier by the signals and then selecting the transmission so as to provide for vestigial side band transmission is known for black and white transmission methods and need not be repeated here. However, such methods are explained in the text "Principles of Television Engineering" by D. G. Fink, published by McGraw-Hill Book Co., Inc. in 1940 in case further reference thereto is desired.

For purposes of illustration, it has been shown that this output is directed to an antenna for radiation to appropriate receivers. It will be appreciated that this is illustrative only and that the signal may be transmitted by any well known form of transmission such as by co-axial cable and other types of direct conductors or transmitters.

The output of camera 1 may be representative of the complete detail of the red component color of the image being televised, or, if desired, may be treated in accordance with the idea set forth in the U. S. Patent 2,535,552 to Alfred C. Schroeder, granted December 26, 1950, which shows a color transmission system in which some of the color detail of at least one of the color components of the image being televised is suppressed for the purpose of economy of the frequency spectrum used in a simultaneous color transmission system.

The optical image which is reflected by the partially transparent reflecting member or dichroic mirror 12 is directed along an optical path to the scansion tube of a second camera unit 20 for scansion purposes. Interposed between the camera 20 and the reflecting member 12 is a color filter 21 which, for purposes of illustration, may be assumed to be a blue filter, i. e., it will allow only the blue component of the optical image to pass through to the camera 20 for scansion purposes. The signal output of camera 20 will then be representative of the blue component color of the optical image being televised.

This signal is passed to a modulator 22 which has supplied thereto a carrier frequency $f_2$, which is developed by and supplied by carrier frequency generator 23. The output of the modulator 22 then will be a carrier frequency modulated with two side bands. This type of signal output is then passed to a side band filter 24 whose purpose is to partially suppress one of the side bands and whose output will comprise a carrier frequency with one complete side band and a vestigial side band. The components may be regarded as of the type hereinbefore explained with respect to the assumed "red" channel supplied from camera 15.

Similarly to the signal developed by camera 15, this signal may be transmitted by any well known transmitting means to the color receivers for reproduction thereof. If so desired, the output of camera 2 may be treated in accordance with the teachings of the above-mentioned Schroeder application, although it should be understood that this invention may be practiced with the above-mentioned Schroeder system but is not limited to use therewith.

The optical image which is reflected from the partially transparent reflecting member or dichroic mirror 13 is directed along an optical path to a third camera unit 30 for scansion purposes. Interposed between camera 30 and the reflector 13 is a third color filter member 31 which, since a special type of signal is to be developed by camera 30, will comprise a special type of color filter. This filter may allow all of the green component color of the optical image to pass through it and with this selected portions of both the red component color and the blue component color if the result desired be a response which will be illustrated clearly in the curves hereinafter explained with reference to Fig. 2.

The output signals developed by camera 30 then will be representative of the entire green component color content of the image being televised and selected and predetermined portions of the values of both of the red and blue component colors. This composite signal then is fed to a modulator 32 which is likewise of well known form which has supplied thereto a carrier frequency $f_3$ which is developed by a carrier frequency generator 33. The output of the modulator 32 then will consist of a carrier frequency and two side bands. This signal is passed to a side band filter 34 whose purpose is to partially suppress one of the side bands, and therefore the output of filter 34 will also be a signal comprising a carrier frequency with one complete side band and one vestigial side band. Side band filters 18, 24 and 34 may be designed in accordance with well known filter circuit theory and since the filters themselves do not comprise the invention per se, and are well known, these are not illustrated in detail here. They may be designed in accordance with the theory set forth in the book entitled "Transmission Networks and Wave Filters" by G. E. Shea, published by D. Van Nostrand, the 1929 edition, or for example, may be as described at page 288 of the Fink text above mentioned.

All of the cameras may use a common deflection control since this is a simultaneous system and for purposes of convenience both the horizontal deflection generators and the vertical deflection generators are grouped in one unit 40 which has been labeled deflection control.

There have been illustrated three separate cameras but it will be appreciated that in actual practice all of these units might be contained within a common housing and need not be separated as indicated in the figure.

This invention also has been illustrated as being particularly adaptable to the simultaneous type of transmission. It will be appreciated that it is possible to develop the component color representative resentations in a sequential manner and by passing the signals developed by two of the cameras through appropriate delay networks, to transmit all of the signals simultaneously despite the fact that they have been developed sequentially. It is easier to use the method of this invention with a simultaneous system, however, where the signals are simultaneously developed and accordingly it is this system which is illustrated.

Again, as an alternative method of deriving the signal containing the green color component and in which there is present some of both the red and the blue component colors, a portion of the output of cameras 15 and 20 may be combined in selected quantities with the output of the third camera and where the third camera does not use the special color filter 31 but, to the contrary, uses a normal green color filter.

Referring to Fig. 2, there is shown a set of explanatory curves in which the relative wave lengths of the blue, green and red component colors are illustrated, as well as the wave lengths of the special signal. These wave lengths are plotted against the human eye response. The scale is given in thousands of Angstrom units and these are the signals which will be reproduced to form the color picture. By Fig. 2 the signals representing the blue color components of the image have been represented by the letter B, the developed signal representing green color components by the letter G. Similarly, the signals representing the red color components of the image are designated by the letter R and the letter M designates the special, or mixed signal wave forms. It will be seen further from these curves that in order to eliminate the red and blue component color signals from the mixed or special signal M some of the received so-called blue and red signals are subtracted from those represented by the curve M so as to eliminate the blue and red color components from the curve M. The curve G, or the signals representing the green component of the image, may be derived from the curve M when received at the color television receiver. A black and white, or monochromatic type, of television receiver can be tuned to the carrier $f_3$, which is the carrier which has been modulated by output signals from camera 30 and these signals contain the full green color component and portions of the red and blue color components. The black and white reproduction now will have components which are illustrative of the blue and red component colors as well as the green and since in an additive system these all add to produce white, it will at once be evident that satisfactory black and white reception may be had. It is this feature which makes this arrangement superior to those systems where the black and white receiver tunes to, or receives, only the signal from the camera which develops a single one of the various component color signals such as the green component color. It is further to be desired in that there is no time difference between signals of the different colors and consequently there is an absence of fringe effects and the definition is improved.

Referring to Fig. 3, there is illustrated apparatus for practicing one method of obtaining the green component color signal at the television receiver from the mixed or special signal represented by the curve M and which contains portions of both the red and blue component colors. This illustration has been made as simple as possible to illustrate the principles involved. The signal of a frequency $f_1$ representative of the red component color detail may be brought into the television receiver and detected and the signal itself passed through an amplifier tube 40 which is resistance coupled to the input of an amplifier tube 41 by means of resistance 42, condenser 43, and resistances 44 and 45, the latter two resistances comprising a voltage divider. In the output circuit of tube 41 there will appear then a selected portion of the signal representative of the red component color and whose level will be selected dependent upon the response value of the curve M. The red signal for use and reproduction by the receiver itself may be passed to the red reproducing kinescope by way of conductor 46.

Similarly, the receiver will have a circuit tuned to the frequency $f_2$ which is modulated in accordance with the signals representative of the blue component color of the image and this will be detected and the detected signal may be fed to amplifying tube 50 similar to the arrangement with which the red component was utilized. The tube 50 is resistance coupled to an amplifying tube 51 by means of resistance 52, condenser 53 and voltage divider resistances 54 and 55. The blue signal is fed to the kinescope reproducing the blue component color by means of conductor 56. The plates of tubes 41 and 51 are connected together and are joined to the plate of a third amplifying tube 60.

The color receiver also will have a circuit tuned to the frequency $f_3$ which is modulated in accordance with the special signal represented by the curve M of Fig. 2 and after detection this signal is fed to the grid of tube 60, this tube having coupling resistor 61 and coupling condenser 62 in the output circuit thereof. If the input levels of tubes 41 and 51 are correctly set, then the signals appearing in the output circuit, or the plate circuit, of these two tubes will, when combined in the manner illustrated with the output circuit of tube 60, subtract from the portion of the curve M which occurs in the red and blue component color spectra and will leave only a signal representative of the green component color to pass through condenser 62 and to be fed via conductor 64 to the kinescope which reproduces the green component color.

There have been illustrated in this figure merely enough tubes to indicate the principles involved. In actual practice the tubes illustrated could be the last amplifying tubes before impression of the signals onto the reproducing kinescopes and, for purposes of clarity, the drawing has been labeled to indicate that these tubes follow the demodulator and/or amplifying stages of the receiver. The direct current level of the signal representing the green component will have been lost before its impression onto the kinescope and the derived signal which is indicative or representative of the optical values of the green component color may be set in accordance with the teachings of such patents as U. S. Patent 2,274,686 of March 3, 1942 to Gray; U. S. Patent 2,240,281 of April 29, 1941 to Ballard; and U. S. Patent 2,252,746 of August 19, 1941 to Willans.

It will be appreciated that as an alternative method the color response of the special filter 31 might be made greater for blue and red than that of either the color filters 14 or 21. This is not considered preferential, but merely alternative, and under these circumstances the amplification of tubes 41 and 51 would have to be selected so as to give a signal of sufficient amplitude so that when combined with the output of tube 60, the curve G of Fig. 2 would result.

It will be appreciated that while the principles of this invention have been described relative to a system operating on a tricolor basis and while bicolor systems are in general less desirable than tricolor systems, nevertheless the principles of this invention could be applied to a bicolor system as well as to the system illustrated and explained.

Having now described the invention, what is claimed and desired to be secured by Letters Patent is the following:

1. In a color television system of the type adapted to receive composite signals containing a first set of signals representative of the optical values of only one of the component colors of an image being televised and a second set of signals representative of the optical values of a second of the component colors of the image and containing signals representative of a selected amount of the optical values of the color represented by the first set of signals, the combination including means for receiving said sets of signals, and electrical mixing means connected to said receiving means for combining a portion of the first set of signals with the second set of signals in opposing phase to eliminate at least partially the signals representative of the portion of the optical values of the color represented by the first set of signals.

2. Apparatus in accordance with claim 1 wherein the means for combining a portion of the first set of signals with the second set of signals includes a first thermionic tube, means for impressing a portion of the first set of signals onto the input circuit of said tube, a second thermionic tube, electrical means for impressing the second set of signals onto the input circuit of the second tube and means coupling the output circuits of the first and second tubes in such phase that the signals in each tube representative of the same component color are substantially eliminated.

3. In a color television system, means for receiving signals containing a first set of signals representative of the optical values of one of the component colors of the image being televised and a second set of signals representative of the optical values of a second of the component colors of the image being televised and a third set of signals representative of the optical values of the image in substantially a black and white rendition thereof, separate electrical means to select the individually transmitted signals, means to convert at least two of the three sets of signals so received directly into light values representing two of the component colors of the image, means to combine selected portions of the signals representing the first and second component colors of the image with the signal representing a substantially black and white rendition to derive a third signal, and means to convert the derived third signal into light values representative of the third component color of the optical image being televised.

4. In a color television system, a first camera apparatus, a color filter interposed between the optical image being televised and the camera apparatus to allow the passage therethrough to the camera of only a first of the component colors of the image, a second camera apparatus, a second color filter interposed between the optical image being televised and the second camera to allow the passage therethrough to the camera of only a second of the component colors of the image, electrical means for combining a portion of the signal representations developed within the first camera apparatus with the signal representations developed by the second camera apparatus to form a composite signal comprised in part by both sets of signals, and means for independently and simultaneously transmitting the signal representations from the first camera and the composite signal.

ALDA V. BEDFORD.

REFERENCES CITED

The following references are of record in the file of this patent:

UNITED STATES PATENTS

| Number | Name | Date |
|---|---|---|
| 2,165,168 | Hardy | July 7, 1939 |
| 2,231,669 | Hall | Feb. 11, 1941 |
| 2,253,086 | Murray | Aug. 19, 1941 |
| 2,253,292 | Goldsmith | Aug. 19, 1941 |
| 2,335,180 | Goldsmith | Nov. 23, 1943 |
| 2,375,966 | Valensi | May 15, 1945 |
| 2,416,918 | Goldsmith | Mar. 4, 1947 |